(12) United States Patent
Khalili et al.

(10) Patent No.: US 11,428,541 B1
(45) Date of Patent: Aug. 30, 2022

(54) TARGETLESS CALIBRATION OF CAMERA AND INERTIAL SENSOR IN A VEHICLE

(71) Applicant: GM GLOBAL TECHNOLOGY OPERATIONS LLC, Detroit, MI (US)

(72) Inventors: Mohsen Khalili, Sterling Heights, MI (US); Hao Yu, Troy, MI (US); Wende Zhang, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/329,613

(22) Filed: May 25, 2021

(51) Int. Cl.
*G01C 25/00* (2006.01)
*G06T 7/70* (2017.01)

(52) U.S. Cl.
CPC ............ *G01C 25/005* (2013.01); *G06T 7/70* (2017.01); *G06T 2207/30244* (2013.01); *G06T 2207/30252* (2013.01)

(58) Field of Classification Search
CPC ................................. G01C 25/005; G06T 7/70
USPC .......................................................... 348/116
See application file for complete search history.

(56) References Cited

U.S. PATENT DOCUMENTS

| | | | |
|---|---|---|---|
| 2018/0232947 A1* | 8/2018 | Nehmadi | G06V 20/56 |
| 2019/0103026 A1* | 4/2019 | Liu | G06T 7/70 |
| 2019/0222756 A1* | 7/2019 | Moloney | H04N 5/23245 |
| 2021/0024096 A1* | 1/2021 | Wang | G06V 20/588 |

* cited by examiner

*Primary Examiner* — Amir Shahnami
(74) *Attorney, Agent, or Firm* — Quinn IP Law (57) ABSTRACT

A calibration system for a camera and an inertial sensor, respectively rigidly affixed to a vehicle, includes a controller having a processor and tangible, non-transitory memory on which instructions are recorded. The camera is adapted to capture one or more images and the inertial sensor is adapted to obtain motion data, including an angular velocity vector of the vehicle. The controller is configured to receive respective data from the camera and the inertial sensor. The controller is configured to perform adaptive feature selection on the one or more images, including extracting one or more regions of interest respectively from the images and calculating a respective optimal quality level for each of the regions of interest. The camera is aligned to the inertial sensor based in part on the adaptive feature selection and the respective data from the inertial sensor.

18 Claims, 3 Drawing Sheets

TARGETLESS CALIBRATION OF CAMERA AND INERTIAL SENSOR IN A VEHICLE

INTRODUCTION

The present disclosure relates generally to a calibration system for a sensor pair in a vehicle. More specifically, the disclosure relates to targetless calibration of a camera and an inertial sensor respectively rigidly affixed to a vehicle. Advanced driver assistance systems and autonomous vehicles generally incorporate various systems for efficient operation, such as anti-lock braking systems, electronic stability control systems, blind spot information systems, lane departure warning systems, adaptive cruise control systems, and traction control systems. These systems rely on inputs from multiple complex perception devices, including various types of imaging sensors, optical sensors and computer vision applications. The data from the sensors is converted into real world coordinates for data association and sensor fusion applications. The quality of sensor alignment and calibration affects the overall accuracy of these systems.

SUMMARY

Disclosed herein is a calibration system for a camera and an inertial sensor, each respectively rigidly affixed to a vehicle. The calibration system includes a controller having a processor and tangible, non-transitory memory on which instructions are recorded. The controller is configured to receive respective data from the camera and the inertial sensor, including one or more images captured by the camera and motion data (e.g., acceleration and angular velocity) acquired by the inertial sensor. The controller is configured to perform adaptive feature selection on the one or more images, including extracting one or more regions of interest respectively from the one or more images and calculating a respective optimal quality level for each of the one or more regions of interest. The camera is aligned to the inertial sensor based in part on the adaptive feature selection and the respective data from the inertial sensor.

Calculating the respective optimal quality level may include obtaining a plurality of preselected parameters, including a desired number of feature points, a maximum number of the feature points and a minimum spacing between the feature points. Calculating the respective optimal quality level may include obtaining a detected number of the feature points in the regions of interest. In some embodiments, the controller is programmed to calculate the respective optimal quality level based on a prior quality level in a previous cycle, a tunable adaptive gain factor, the maximum number of the feature points, the desired number of the feature points, and the detected number of the feature points. The controller may be programmed to determine the respective optimal quality level (as:

$$\left(QL_{prior} - G * \left[\frac{M-F}{D}\right]\right),$$

where $QL_{prior}$ is the prior quality level, M is the maximum number of the feature points, D is the desired number of the feature points, G is the tunable adaptive gain factor and F is the detected number of the feature points.

In some embodiments, the controller is configured to perform a feature detection routine on the one or more regions of interest based in part on the current quality level, the plurality of preselected parameters and the detected number of the feature points. The feature detection routine may be adapted to generate an updated value of the detected number of the feature points. In one example, the feature detection routine is a Shi-Tomasi corner detector. Performing the adaptive feature selection may include detecting a respective plurality of feature points in the one or more regions of interest based in part on the respective optimal quality level. In some embodiments, the controller is configured to remove one or more respective outlier features in the one or more regions of interest.

In some embodiments, the motion data includes an angular velocity vector having respective components, the respective components including a first angular velocity around a first axis, a second angular velocity around a second axis and a third angular velocity around a third axis. The controller may be programmed to exclude calibration results of a current cycle when at least two of the respective components of the angular velocity vector are below a predefined threshold. The controller may be programmed to include the calibration results of the current cycle when at least two of the respective components of the angular velocity vector are greater than or equal to the predefined threshold.

In some embodiments, the controller is programmed to determine if a diagnostic evaluation is triggered, based on at least one of a scheduled time, a user input and one or more predefined events. The controller may be programmed to perform a six-degree of freedom calibration when the diagnostic evaluation is triggered. The controller may be programmed to perform a three-degree of freedom calibration when the diagnostic evaluation is not triggered.

Disclosed herein is a method of calibrating a camera and an inertial sensor in a vehicle having a controller with a processor and tangible, non-transitory memory, the camera and the inertial sensor being rigidly affixed to the vehicle. The method includes receiving respective data from the camera and the inertial sensor, the respective data including one or more images captured by the camera and motion data acquired by the inertial sensor. The method includes performing adaptive feature selection on the one or more images, including extracting one or more regions of interest in the one or more images and calculating a respective optimal quality level for the one or more regions of interest. The camera is aligned to the inertial sensor based in part on the adaptive feature selection and the respective data from the inertial sensor.

The above features and advantages and other features and advantages of the present disclosure are readily apparent from the following detailed description of the best modes for carrying out the disclosure when taken in connection with the accompanying drawings.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Figure 1:
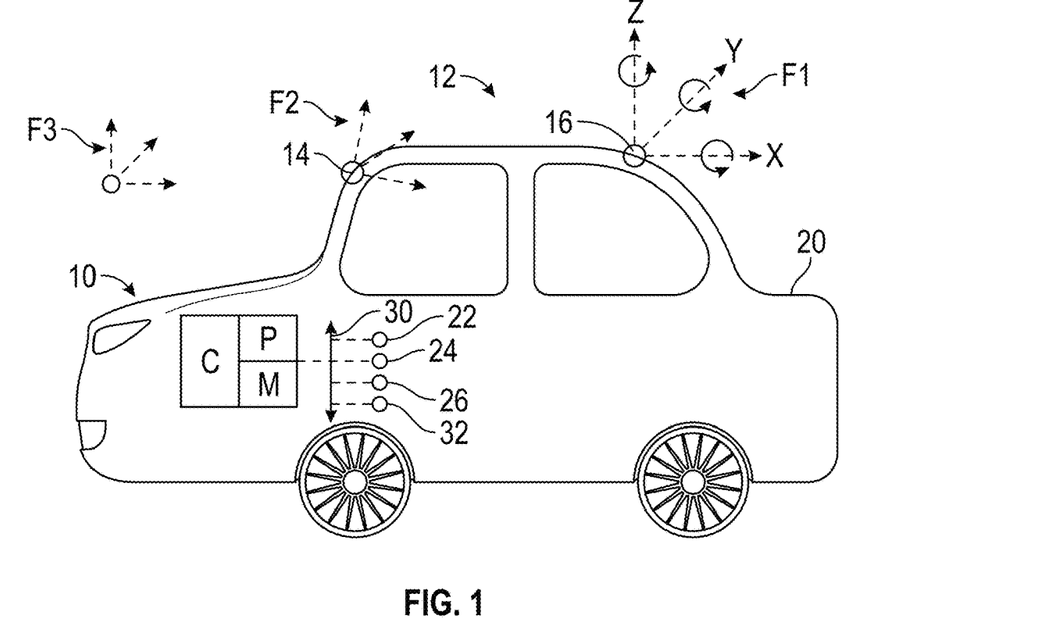
FIG. 1 is a schematic fragmentary diagram of a calibration system for a vehicle having a camera, an inertial sensor, and a controller.

Referring to the drawings, wherein like reference numbers refer to like components, FIG. 1 schematically illustrates a calibration system 10 for a sensor pair 12, which includes a camera 14 and an inertial sensor 16. The camera 14 and inertial sensor 16 are each respectively rigidly affixed, connected or attached (directly or indirectly) to a mobile platform 20, referred to herein as vehicle 20. The respective locations of the camera 14 and the inertial sensor 16 on/in the vehicle 20 may be varied based on the application at hand. The vehicle 20 may include, but is not limited to, a passenger vehicle, sport utility vehicle, light truck, heavy duty vehicle, minivan, bus, transit vehicle, bicycle, moving robot, farm implement (e.g., tractor), sports-related equipment (e.g., golf cart), boat, plane, train or other moving platform having the sensor pair 12. The vehicle 20 may be an electric vehicle, which may be purely electric or hybrid/partially electric. It is to be understood that the vehicle 20 may take many different forms and have additional components.

Referring to FIG. 1, the calibration system 10 includes a controller C having at least one processor P and at least one memory M (or non-transitory, tangible computer readable storage medium) on which instructions are recorded for executing a method 100, described in detail below with respect to FIG. 3, of calibrating the sensor pair 12. The memory M can store controller-executable instruction sets, and the processor P can execute the controller-executable instruction sets stored in the memory M. The calibration system 10 is adaptive to different types of lighting conditions and does not require expensive target and calibration setup.

The camera 14 of FIG. 1 is adapted to obtain visualization data and may incorporate various types of optical sensors and photodetectors available to those skilled in the art. The camera 14 may be a stereoscopic camera adapted to obtain left and right image pairs. The inertial sensor 16 is a device that integrates multiple sensors to estimate the spatial orientation of an object. Referring to FIG. 1, the inertial sensor 16 is configured to obtain motion data of the vehicle 20 in a plurality of directions, for example linear acceleration, linear velocity and rotational angular velocity, each respectively along an X axis, a Y axis and a Z axis. The inertial sensor 16 may include a respective accelerometer, gyroscope, and magnetometer (not shown) per axis to determine rotational acceleration along the X axis, the Y axis and the Z axis, referred to as roll, pitch, and yaw, respectively. The inertial sensor 16 defines an inertial frame of reference F1, while the camera 14 defines a camera frame of reference F2, both relative to a global frame of reference F3.

For accurate navigation and measurement, the inertial frame of reference F1 and camera frame of reference F2 are aligned to the global frame of reference F3 in a process sometimes referred to as extrinsic parameter calibration. In this process, a coordinate transforming relationship is established between the various frames of reference, generally with the use of calibration targets. The calibration system 10 (via execution of the method 100) offers solutions to perform an extrinsic calibration to support sensor alignment requirements, without requiring the use of a specific calibration target. Method 100 is based on matching feature points (e.g., road-side features) detected in the images obtained by the camera 14 and the vehicle motion data derived from the inertial sensor 16.

The controller C of FIG. 1 may be an integral portion of, or a separate module operatively connected to, other controllers of the vehicle 20. For example, the controller C may be an electronic control unit (ECU) of the vehicle 20. The controller C may receive input from other sensors operatively connected to the vehicle 20, such as for example, a navigation sensor 22 and a radar unit 24. The navigation sensor 22, which may be a global positioning satellite (GPS) sensor, is configured to obtain location coordinates of the vehicle 20, such as latitude and longitude values. Referring to FIG. 1, the controller C may have access to a map database 26, which may be a public or commercial source of information available to those skilled in the art, such as for example, Google Earth. Alternatively, the map database 26 may be loaded onto the memory M of the controller C.

Referring to FIG. 1, the various components of the calibration system 10 may be in communication with the controller C (and each other) via a wireless network 30, which may be a short-range network or a long-range network. The wireless network 30 may be a communication BUS, which may be in the form of a serial Controller Area Network (CAN-BUS). The wireless network 30 may incorporate a Bluetooth™ connection, a Wireless Local Area Network (LAN) which links multiple devices using a wireless distribution method, a Wireless Metropolitan Area Network (MAN) which connects several wireless LANs or a Wireless Wide Area Network (WAN). Other types of connections may be employed.

Figure 2:
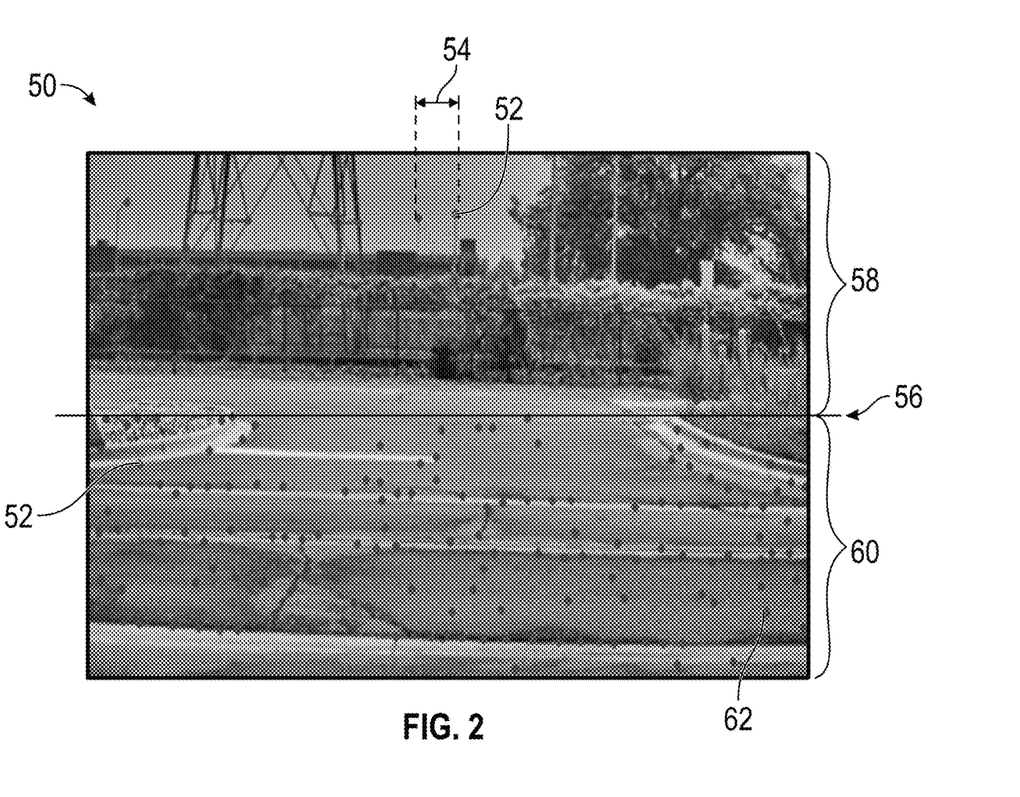
FIG. 2 is a schematic example image captured by the camera of FIG. 1.

An example image 50 (or image frame) captured by the camera 14 is shown in FIG. 2 and described below. Referring to FIG. 2, the image 50 is overlaid with feature points 52 that are detected by the controller C, e.g., via a feature detection routine 32. The feature detection routine 32 may employ edge detection, corner detection, ridge detection, scale-invariant transformation, or other types of techniques. The feature points 52 are separated by a spacing 54. The image 50 may be divided into one or more regions of interest 56, each having a respective plurality of feature points 52. As described below, the method 100 includes a mechanism for adaptively selecting the highest quality feature points 52 from an image (e.g., image 50 in FIG. 2), and ensuring a uniform distribution of the feature points 52. The method 100 prevents detection of feature points that are of low-quality, or detection of too few (i.e., small number of) feature points 52, which may potentially generate errors in the calibration parameters.

Figure 3:
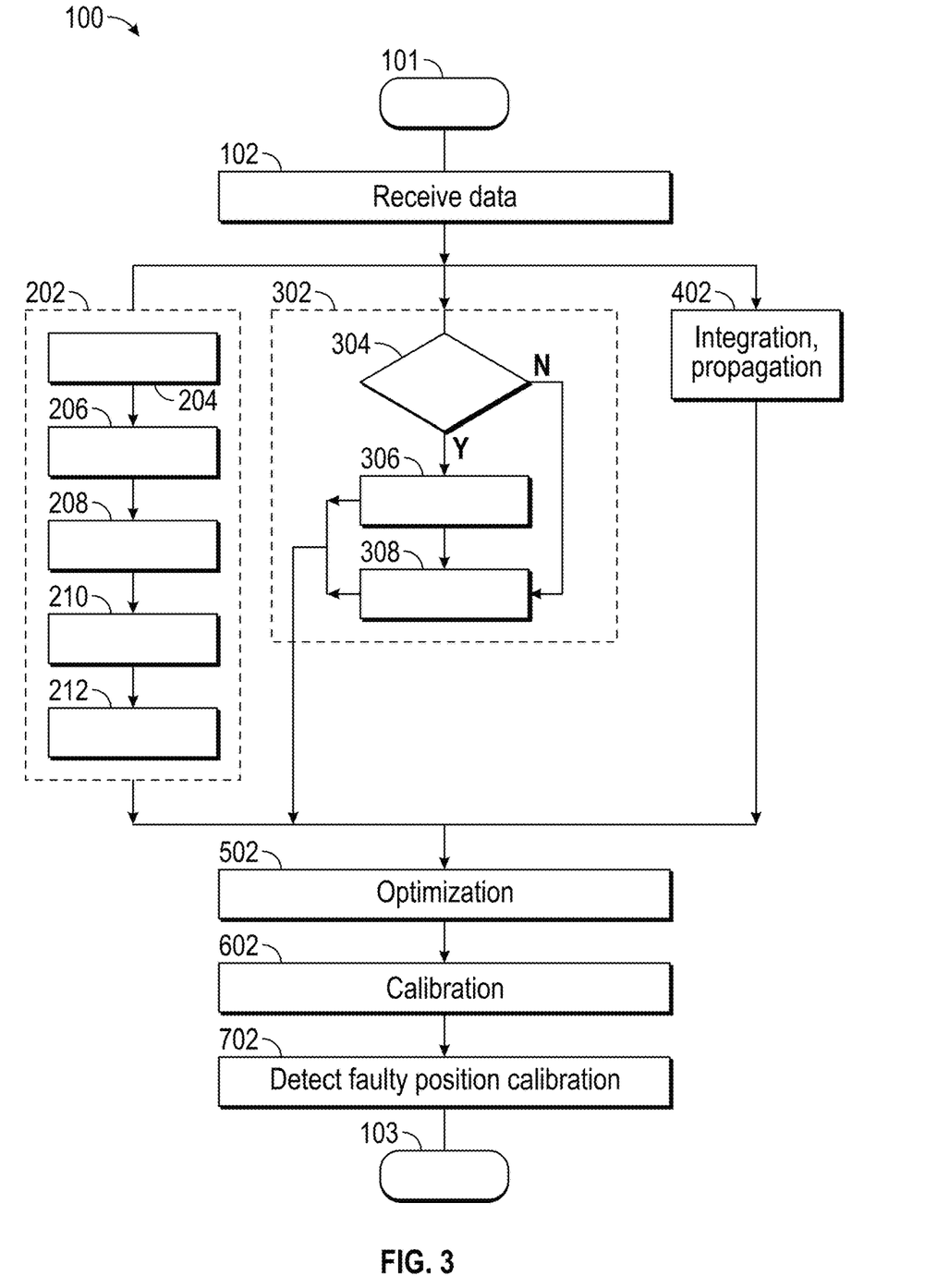
FIG. 3 is a flowchart for a method of operating the calibration system of FIG. 1.

Referring now to FIG. 3, a flowchart of the method 100 is shown. Method 100 may be embodied as computer-readable code or instructions stored on and partially executable by the controller C of FIG. 1. Method may be executed in real-time, continuously, systematically, sporadically and/or at regular intervals, for example, each 10 milliseconds during normal and ongoing operation of the vehicle 20.

Method 100 of FIG. 3 begins at block 101, ends at block 103 and includes sub-routines or modules 102, 202, 302, 402, 502, 602 and 702. Method 100 need not be applied in the specific order recited herein. Furthermore, it is to be understood that some modules (or some blocks within the modules) may be eliminated.

Per module 102, the controller C is programmed to receive respective data from the camera 14 and the inertial sensor 16, including but not limited to, one or more images taken over a predefined time interval and angular velocity data (e.g., an angular velocity vector). From module 102, the method 100 may proceed simultaneously to modules 202, 302 and 402.

Per module 202 of FIG. 3, the controller C is programmed to perform adaptive feature selection, including detecting high-quality features that are robust to environmental lighting conditions. Module 202 includes blocks 204, 206, 208, 210 and 212. Module 202 begins with block 204 where the controller C is programmed to extract one or more regions of interest 56 (see FIG. 2), such as a first region of interest 58 and a second region of interest 60, from the image 50.

Figure 4:
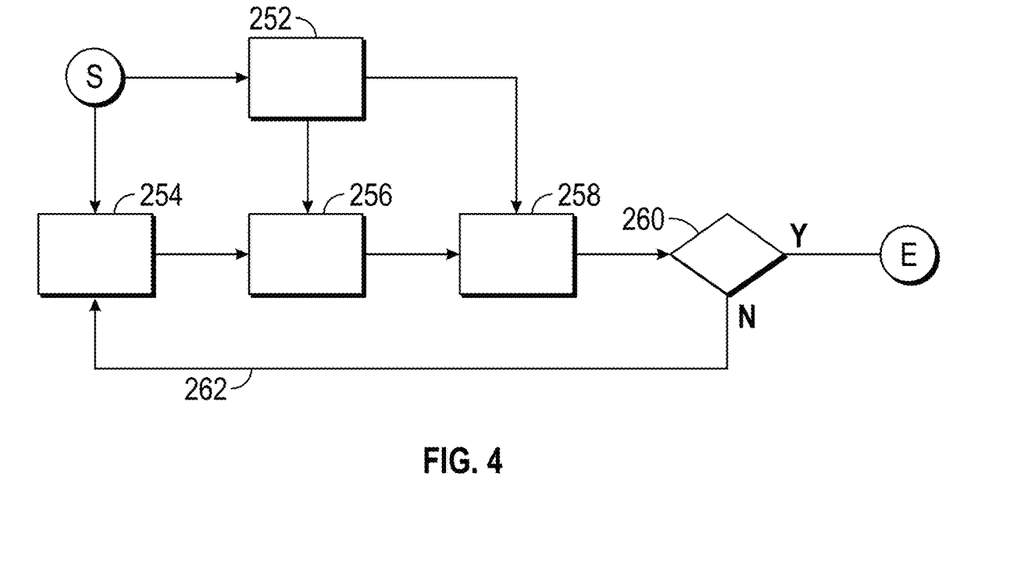
FIG. 4 is a flowchart showing in detail a portion of the method of FIG. 3.

Next, per block 206, the controller C is programmed to adaptively calculate a respective optimal quality level for each of the regions of interest 56. The quality level is a parameter characterizing the minimally accepted quality of an image feature point, such as an edge or corner. In some embodiments, the quality level is a normalized number between 0 and 1. The feature point (e.g., corner) with a respective score or quality measuring less than the quality level is rejected. Under some circumstances, e.g., a low-light situation, a relatively lower quality level is suitable, while under other circumstances, a relatively higher quality level is suitable. An example implementation of block 206 is shown in FIG. 4, with a feedback loop mechanism. Referring to FIG. 4, per sub-block 252, the controller C is adapted to obtain a plurality of preselected parameters, including a desired number (D) of feature points 52 per frame, a maximum number (M) of feature points 52 per frame and a minimum value of the spacing 54 between feature points 52. The plurality of preselected parameters may be pre-programmed or selectable by a user. Per sub-block 254, the controller C is adapted to obtain a detected number (F) of the feature points 52 for each iteration or cycle. A feature detection routine 32 available to those skilled in the art may be employed, employing edge detection, corner detection, ridge detection, scale-invariant transformation, or other types of techniques. For example, the feature detection routine 32 may be a Shi-Tomasi corner detector, a Harris corner detector or a Susan detector. The feature detection routine 32 outputs or generates an updated value of the detected number (F) of the feature points 52. For the first iteration or cycle, an initialized value of the detected number (F) may be preselected.

Referring to FIG. 4, sub-block 256 receives input from sub-block 252 and sub-block 254. Per sub-block 256, the controller C is adapted to calculate a current quality level ($QL_{current}$) based on a prior quality level ($QL_{prior}$) in the previous iteration, the maximum number (M), the desired number (D) and the detected number (F) of the feature points 52. The current quality level ($QL_{current}$) may be determined as:

$$QLcurrent = QLprior - G * \left[\frac{M-F}{D}\right],$$

with G being an adaptive gain factor. For example, the value of the adaptive gain factor (G) may be selected to be 0.1. However, it is understood that the value of the adaptive gain factor (G) may be tuned based on the application at hand. For the first iteration, an initialized value of the prior quality level ($QL_{prior}$) may be selected. Next, per block 258, the controller C is programmed to obtain an updated value of the detected number (F) of feature points 52, with the current quality level ($QL_{current}$) determined in sub-block 256 (via feature detection routine 32). As noted above, the quality level is a parameter characterizing the minimally accepted quality of a feature point in a frame, with the feature points having a respective quality measuring less than the current quality level ($QL_{current}$) being rejected.

The adaptive feature selection algorithm is able to determine the optimal quality level for each separate frame/scenario. For instance, if the vehicle 20 moves from a bright scene to a darker scene, the controller C adaptively reduces the feature quality level based on the number of feature points 52 currently detected versus the desired number of feature points 52. This enables more feature points 52 to be detected and improved calibration performance. Optionally, execution of block 206 may proceed to decision block 260, where the controller C is adapted to determine if a difference ($\Delta Q = QL_{current} - QL_{prior}$) between the current quantity level and the prior quantity level is within a predefined value. If the difference is within the predefined value (decision block 260=YES), block 206 is ended. In a non-limiting example, block 206 is ended when the current quantity level and the prior quantity level are within 1% of each other. If not (decision block 260=NO), the cycle is repeated with a feedback loop. In other words, as indicated by line 262, the detected number (F) of the feature points 52 that were determined in sub-block 258 are used to update sub-block 254 and the process is repeated. For each of the regions of interest 56, the controller C may be configured to set the respective optimal quality level as the current quality level when the difference between the prior quantity level and the current quality level is within the predefined value.

Referring back to FIG. 3, the module 202 proceeds from block 206 to block 208. Per block 208, the controller C is programmed to extract the feature points 52 detected for each of the regions of interest 56 with the respective optimal quality level determined in block 206. The module 202 proceeds to block 210, where outlier features 62, among the feature points 52 in each of the regions of interest 56, may be removed. As understood by those skilled in the art, data may include "inliers", which may be explained by certain model parameters, and "outliers" which do not fit the model. An example routine available to remove outlier features 62 is the Random Sample Consensus routine, referred to as RANSAC.

Per block 212, the controller C is programmed to track the feature points 52 and obtain the orientation and up-to-scale position of the camera 14 in each image 50 relative to the camera 14 in other images. Here, the controller C is programmed to determine the spatial and geometric relationship of the feature points 52 (extracted in block 208) through the movement of the camera 14, via optical flow methods, structure from motion (SFM) techniques/routines and other 3-D reconstruction routines available to those skilled in the art.

Referring now to module 302 of FIG. 3, the controller C may be programmed to detect degenerate motion and exclude the results of the current iteration under certain scenarios. Module 302 begins at block 304, where the controller C is programmed to determine if at least two of the respective components of an angular velocity vector of the vehicle 20 are greater than or equal to a predefined threshold. This allows for a sufficient or strong signal excitation for calibration purposes. In a non-limiting example, the predefined threshold may be set between about 0.03 and 0.04 radians per second. The angular velocity vector is obtained from the data acquired by the inertial sensor 16 and includes three components: a first angular velocity ($\omega_X$) around a first axis (e.g., the X axis), a second angular velocity ($\omega_Y$) around a second axis (e.g., the Y axis) and a third angular velocity ($\omega_Z$) around a third axis (e.g., the Z axis).

If block 304=YES (i.e., at least two of ($\omega_X$, $\omega_Y$, $\omega_Z$) are greater than or equal to the predefined threshold), the module 302 proceeds to block 306, where the calibration results of the current iteration or cycle are included in the dataset outputted to module 502. If block 304=NO, the module 302 proceeds to block 308, where the calibration results of the current iteration or cycle are excluded from the dataset outputted to module 502. While calibration results in the current cycle are excluded from the optimization, the previous calibration results are kept fixed during optimization stage at the current timestamp, iteration or cycle. Module 302 is ended at blocks 306 and 308.

Per module 402 of FIG. 3, the controller C is programmed to integrate propagation data from the various sensors in the inertial sensor 16. The propagation data includes the position and velocity of the vehicle 20, how much the vehicle 20 has moved in a specified time and the orientation of the vehicle 20. Referring to FIG. 3, after execution of modules 202, 302 and 402, method 100 proceeds to module 502.

Per module 502 of FIG. 3, the controller C is programmed to receive a calibration dataset (from modules 202, 302 and 402). The controller C is adapted to perform nonlinear optimization on the calibration dataset to align the detected/tracked feature points 52 and vehicle motion/orientation data. Estimating the motion and orientation of the vehicle 20 may involve the use of visual odometry techniques on a sequence of images captured by the moving camera 14. For example, the feature points that were detected in a first image frame are matched to a second image frame. This information is used to construct an optical flow field for the detected feature points in those two images. The optical flow field illustrates divergence from a single point, indicating the direction of the motion of the camera 14, and thus providing an estimate of the motion of the camera 14 (and vehicle 20). This information is matched to the vehicle motion data from the inertial sensor 16 (integrated in module 402) to generate alignment data. This process may be repeated for multiple sets of adjacent images. In some embodiments, a machine learning algorithm may be employed to minimize a cost function based on projection errors between two adjacent images.

Figure 5:
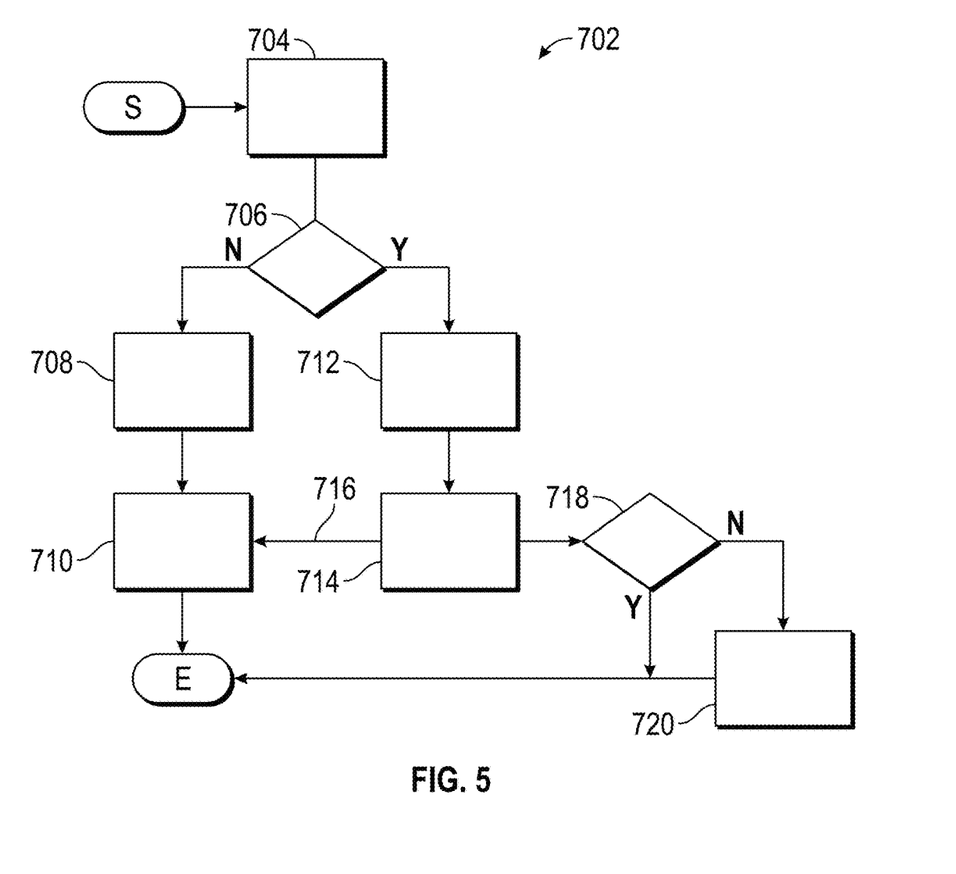
FIG. 5 is a flowchart showing in detail another portion of the method of FIG. 3.

From module 502, method 100 proceeds to module 602. Per module 602 of FIG. 3, the controller C is programmed to perform calibration for the inertial frame of reference F1 and the camera frame of reference F2, based on the alignment data generated in module 502. Specifically, a coordinate transforming relationship is established between the inertial frame of reference F1, the camera frame of reference F2 and the global frame of reference F3. From module 602, the method 100 proceeds to module 702. Per module 702 of FIG. 3, the controller C is programmed to detect faulty position calibration. An example implementation of module 702 is shown in FIG. 5. Referring now to FIG. 5, module 702 begins at block 704, where the controller C is programmed to track the feature points 52 (examples of which are shown in FIG. 2). Module 702 proceeds to decision block 706 to ascertain if a diagnostic evaluation should be performed, based on a scheduled time, user input and sensor replacement, and other factors. For example, a diagnostic evaluation may set up to be performed at specific time intervals, upon the happening of a specific event (e.g., an engine event, scheduled maintenance) or when requested by a user.

Referring to FIG. 5, if it is ascertained that the diagnostic evaluation should not be performed (decision block 706=NO), module 702 advances to block 708, where a three-degree of freedom calibration is performed. From block 708, module 702 advances to block 710, where the orientation calibration is updated and module 702 is ended. If it is ascertained that the diagnostic evaluation should be performed (decision block 706=YES), module 702 advances to block 712, where the vehicle 20 is driven in a parking lot with a plurality of turns (for example at least two turns) and block 714, where a six-degree of freedom calibration is performed. The six-degree of freedom calibration covers translation along the three perpendicular axes, combined with changes in orientation through rotation about the three perpendicular axes, termed yaw (normal axis), pitch (transverse axis), and roll (longitudinal axis).

Referring to FIG. 5, from block 714, module 702 advances to block 710 (as indicated by line 716), where the orientation calibration is updated, and to decision block 718 to determine if the existing position calibration is valid. In other words, the existing position calibration (from module 602) is compared with the results of the six-degree of freedom calibration (performed in block 714). If the existing position calibration is sufficiently close or valid (decision block 718=YES), module 702 is ended. If the existing position calibration is not valid (decision block 718=NO), module 702 advances to block 720. Referring to FIG. 5, per block 720, the existing position calibration is updated based on the six-degree of freedom calibration performed in block 714 and module 702 is ended.

In summary, the calibration system 10 (via execution of the method 100) allows accurate calibration of the sensor pair 12, by utilizing feature detection, tracking the image sequences captured by the camera 14 and matching them to the data from the inertial sensor 16. The calibration system 10 minimizes calibration error due to degenerate motion, for example, by stopping the calibration when there is no two-axis rotation. The method 100 includes a decision scheme (illustrated by module 702 in FIG. 5) to select between a fast three degree-of-freedom dynamic calibration for orientation of the sensor pair 12 and a six degree-of-freedom dynamic calibration for position and orientation of the sensor pair 12. The method 100 maintains a certain number of detected high quality features for robustness to ambient lighting condition, ensuring that a minimum number of feature points with the highest quality are selected and a uniform distribution of such feature points 52 is maintained.

The controller C of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium with patterns of holes, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a set of files in a file rechargeable energy storage system, an application database in a proprietary format, a relational database energy management system (RDBMS), etc. Each such data store may be included within a computing device employing a computer operating system such as one of those mentioned above and may be accessed via a network in one or more of a variety of manners. A file system may be accessible from a computer operating rechargeable energy storage system and may include files stored in various formats. An RDBMS may employ the Structured Query Language (SQL) in addition to a language for creating, storing, editing, and executing stored procedures, such as the PL/SQL language mentioned above.

The flowcharts in FIGS. 3-5 illustrate an architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based rechargeable energy storage systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A calibration system for a camera and an inertial sensor respectively rigidly affixed to a vehicle, the calibration system comprising:
   a controller having a processor and tangible, non-transitory memory on which instructions are recorded, execution of the instructions by the processor causing the controller to:
   receive respective data from the camera and the inertial sensor, the respective data including one or more images captured by the camera and motion data acquired by the inertial sensor;
   perform adaptive feature selection on the one or more images, including extracting one or more regions of interest in the one or more images and calculating a respective optimal quality level for the one or more regions of interest; and
   align the camera to the inertial sensor based in part on the adaptive feature selection and the respective data from the inertial sensor;
   wherein the controller is programmed to determine if a diagnostic evaluation is triggered, based on at least one of a scheduled time, a user input and one or more predefined events; and
   wherein the controller is programmed to perform a six-degree of freedom calibration when the diagnostic evaluation is triggered.

2. The calibration system of claim 1, wherein calculating the respective optimal quality level includes:
   obtaining a plurality of preselected parameters, including a desired number of feature points, a maximum number of the feature points and a minimum spacing between the feature points; and
   obtaining a detected number of the feature points in the one or more regions of interest.

3. The calibration system of claim 2, wherein:
   the controller is programmed to calculate the respective optimal quality level based on a prior quality level in a previous cycle, a tunable adaptive gain factor, the maximum number of the feature points, the desired number of the feature points, and the detected number of the feature points.

4. The calibration system of claim 3, wherein:
   the controller is programmed to determine the respective optimal quality level (as:

$$\left(QL_{prior} - G * \left[\frac{M-F}{D}\right]\right),$$

where $QL_{prior}$ is the prior quality level, M is the maximum number of the feature points, D is the desired number of the feature points, G is the tunable adaptive gain factor and F is the detected number of the feature points.

5. The calibration system of claim 2, wherein:
the controller is configured to perform a feature detection routine on the one or more regions of interest based in part on the current quality level, the plurality of preselected parameters and the detected number of the feature points; and
the feature detection routine is adapted to generate an updated value of the detected number of the feature points.

6. The calibration system of claim 5, wherein:
the feature detection routine is a Shi-Tomasi corner detector.

7. The calibration system of claim 1, wherein:
performing the adaptive feature selection includes detecting a respective plurality of feature points in the one or more regions of interest based in part on the respective optimal quality level.

8. The calibration system of claim 7, wherein:
the controller is configured to remove one or more respective outlier features in the one or more regions of interest.

9. The calibration system of claim 1, wherein:
the motion data includes an angular velocity vector having respective components, the respective components including a first angular velocity around a first axis, a second angular velocity around a second axis and a third angular velocity around a third axis; and
the controller is programmed to exclude calibration results of a current cycle when at least two of the respective components of the angular velocity vector are below a predefined threshold.

10. The calibration system of claim 9, wherein:
the controller is programmed to include the calibration results of the current cycle when at least two of the respective components of the angular velocity vector are greater than or equal to the predefined threshold.

11. The calibration system of claim 1, wherein: the controller is programmed to perform a three-degree of freedom calibration when the diagnostic evaluation is not triggered.

12. A method of calibrating a camera and an inertial sensor in a vehicle having a controller with a processor and tangible, non-transitory memory, the camera and the inertial sensor being rigidly affixed to the vehicle, the method comprising:
receiving respective data from the camera and the inertial sensor, the respective data including one or more images captured by the camera and motion data acquired by the inertial sensor;
performing adaptive feature selection on the one or more images, including extracting one or more regions of interest in the one or more images and calculating a respective optimal quality level for the one or more regions of interest; and
aligning the camera to the inertial sensor based in part on the adaptive feature selection and the respective data from the inertial sensor;
wherein calculating the respective optimal quality level includes:
obtaining a plurality of preselected parameters, including a desired number of feature points, a maximum number of the feature points and a minimum spacing between the feature points;
obtaining a detected number of the feature points in the one or more regions of interest; and
calculating a current quality level based on a prior quality level in a previous cycle, the maximum number of the feature points, the desired number of the feature points and the detected number of the feature points.

13. The method of claim 12, wherein calculating the current quality level includes:
calculating the current quality level as $$\left(QL_{prior} - G * \left[\frac{M-F}{D}\right]\right),$$

where $QL_{prior}$ is the prior quality level, M is the maximum number of the feature points, D is the desired number of the feature points, G is a tunable adaptive gain factor and F is the detected number of the feature points.

14. The method of claim 12, further comprising:
performing a feature detection routine on the one or more regions of interest based in part on the current quality level, the plurality of preselected parameters and the detected number of the feature points, via the controller; and
generating an updated value of the detected number of the feature points, via the feature detection routine.

15. The method of claim 12, wherein performing the adaptive feature selection includes:
detecting a respective plurality of feature points in the one or more regions of interest based in part on the respective optimal quality level; and
removing one or more respective outlier features in the one or more regions of interest.

16. The method of claim 12, wherein the motion data includes an angular velocity vector having respective components, the method further comprising:
excluding the respective data of a current cycle when at least two of the respective components of the angular velocity vector are above a predefined threshold, the respective components of the angular velocity vector including a first angular velocity around a first axis, a second angular velocity around a second axis and a third angular velocity around a third axis; and
including the respective data of the current cycle when at least two of the respective components of the angular velocity vector are less than or equal to the predefined threshold.

17. The method of claim 12, further comprising:
determining if a diagnostic evaluation is triggered, based on at least one of a scheduled time, a user input and one or more predefined events, via the controller;
performing a six-degree of freedom calibration when the diagnostic evaluation is triggered; and
performing a three-degree of freedom calibration when the diagnostic evaluation is not triggered.

18. A calibration system for a camera and an inertial sensor respectively rigidly affixed to a vehicle, the calibration system comprising:
a controller having a processor and tangible, non-transitory memory on which instructions are recorded, execution of the instructions by the processor causing the controller to:
receive respective data from the camera and the inertial sensor, the respective data including one or more images captured by the camera and motion data acquired by the inertial sensor;
perform adaptive feature selection on the one or more images, including extracting one or more regions of interest in the one or more images and calculating a respective optimal quality level for the one or more regions of interest; and align the camera to the inertial sensor based in part on the adaptive feature selection and the respective data from the inertial sensor;

wherein calculating the respective optimal quality level includes obtaining a plurality of preselected parameters, including a desired number of feature points, a maximum number of the feature points and a minimum spacing between the feature points, and obtaining a detected number of the feature points in the one or more regions of interest; and wherein the controller is programmed to calculate the respective optimal quality level based on a prior quality level in a previous cycle, a tunable adaptive gain factor, the maximum number of the feature points, the desired number of the feature points, and the detected number of the feature points.

* * * * *